(12) United States Patent
Taketsuna et al.

(10) Patent No.: US 7,094,175 B2
(45) Date of Patent: Aug. 22, 2006

(54) LUBRICATION DEVICE FOR TOROIDAL TYPE CONTINUOUSLY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 299 days.

(21) Appl. No.: 10/450,197

(22) PCT Filed: Dec. 21, 2001

(86) PCT No.: PCT/JP01/11257

§ 371 (c)(1),
(2), (4) Date: Jun. 12, 2003

(87) PCT Pub. No.: WO02/053944

PCT Pub. Date: Jul. 11, 2002

(65) Prior Publication Data

US 2004/0029674 A1 Feb. 12, 2004

(30) Foreign Application Priority Data

Dec. 28, 2000 (JP) ............................. 2000-402232

(51) Int. Cl.
*F16H 57/04* (2006.01)
(52) U.S. Cl. .................. 476/8; 476/10; 476/40; 476/42
(58) Field of Classification Search ................. 476/8, 476/9, 10, 1, 2, 12, 40, 42
See application file for complete search history.

(56) References Cited

U.S. PATENT DOCUMENTS 3,455,177 A 7/1969 Schofield
4,126,052 A * 11/1978 Jackman ................. 476/10
5,540,631 A * 7/1996 Lohr et al. ............... 476/10
5,971,885 A 10/1999 Greenwood et al.
6,036,617 A * 3/2000 Kidokoro et al. ......... 476/3
6,066,060 A 5/2000 Harper
6,659,906 B1 * 12/2003 Oshidari ................. 476/10
6,705,964 B1 * 3/2004 Nagai et al. ............ 475/216
2002/0049113 A1 * 4/2002 Watanabe et al. .......... 476/8
2003/0106734 A1 * 6/2003 Nagai et al. ............. 180/233
2004/0029674 A1 * 2/2004 Taketsuna et al. .......... 476/8

FOREIGN PATENT DOCUMENTS

| DE | 16 50 677 A1 | 10/1970 |
|---|---|---|
| EP | 1 347 204 A1 * | 9/2003 |
| JP | U 1-82356 | 6/1989 |
| JP | U 2-47458 | 3/1990 |
| JP | U 2-80258 | 6/1990 |

(Continued)

*Primary Examiner*—David Fenstermacher
(74) *Attorney, Agent, or Firm*—Oliff & Berridge, PLC

(57) ABSTRACT

A lubrication device for a toroidal type continuously variable transmission, which can set the speed change ratio continuously by transmitting a torque inputted from a power source by rolling members contacting each other through an oil film, and by varying the position of the contact portion of those rolling members steplessly, characterized by comprising: an auxiliary hydraulic power unit for generating an oil pressure without relying on said power source, a preliminary operation detector for detecting whether or not the preliminary operation relative to the start up of said power source is executed, and a preliminary lubricating mechanism for feeding the lubricating oil to the contact portion between said rolling members by means of said auxiliary hydraulic power unit before starting up said power source, when the preliminary operation is detected.

18 Claims, 7 Drawing Sheets

FOREIGN PATENT DOCUMENTS

| | | |
|---|---|---|
| JP | U 5-86059 | 11/1993 |
| JP | A 7-19321 | 1/1995 |
| JP | A 8-61483 | 3/1996 |
| JP | A 10-132045 | 5/1998 |
| JP | A 10-132047 | 5/1998 |
| JP | A 11-36132 | 3/1999 |
| JP | U 11-39 | 3/1999 |
| JP | A 11-230494 | 8/1999 |
| JP | A 2000-507667 | 6/2000 |
| JP | A 2000-297852 | 10/2000 |

\* cited by examiner

LUBRICATION DEVICE FOR TOROIDAL TYPE CONTINUOUSLY VARIABLE TRANSMISSION

TECHNICAL FIELD

This invention relates to a toroidal type (or traction type) continuously variable transmission, which transmits a torque between rolling members with utilizing a shearing force of an oil film formed on the surface of the rolling members, and especially, this invention relates to a lubrication device for feeding a lubricating oil to form the oil film.

BACKGROUND ART

As one example of continuously variable transmission, a transmission, which is constructed to clamp a power roller between a pair of discs arranged opposed to each other is known. The portion of the pair of discs where an outer circumferential side from a predetermined radius has an arcuate plane of a predetermined radius as cut in a plane on the center axis. On the other hand, the power roller is a disc-shaped member, and its sectional figure along the in-depth direction of the outer circumferential portion is congruent with the arcuate figure of the opposed face of the discs. The power roller is clamped in between a pair of the discs, and the power roller is rotated by rotating one of the discs, and the other disc rotates sequentially. Then, the power roller is inclined to move the radial position of the contact portion against one of the discs, i.e., the radial position from the center axis of the disc outward, and also to move the radial position of the contact portion against the other disc to inner circumferential side, so that the speed change ratio corresponding to the proportion of the radii of each contact portions is thereby set.

In the toroidal type continuously variable transmission, a torque is thus transmitted between a pair of discs through the power roller. However, if the transmission of the torque is executed by a frictional force between the disc and the roller, abrasion of a frictional contact portion is rather hard and become unable to use precociously. Therefore, according to the prior art, the construction is made to form an oil film between the power rollers and the discs, and transmit the torque by a shearing force of the oil film. One example of the devise for feeding lubricating oil is disclosed in Japanese Patent Laid-Open No. 10-132047.

The construction disclosed in this Laid-Open will be described briefly hereafter. There is provided a roller holding member, which is shaped to clamp the power roller from both top and bottom sides, and the power roller is held by the roller holding member in a rotatable condition. The roller holding member is connected to a piston rod of a linear acting type hydraulic cylinder through a ball joint, and an oil passage for feeding the lubricating oil is formed inside of the piston rod and the roller holding member. And the leading end portion of the oil passage opens to the position opposed to the outer circumferential face of the power roller at the roller holding member. Accordingly, an oil pressure is generated by a hydraulic pump driven by a power source such as an engine, under the status such that the power source is operated to rotate the disc with inputting the torque to the disc of input side. As a result, the lubricating oil fed by a pressure through the oil passage is blown to the outer circumferential face of the power roller. The lubricating oil thus adhered on the power roller is fed to the contact portion against the disc and the oil film is thereby formed consequently.

As mentioned above, generally, the lubricating oil is fed compulsorily according to the prior art. Accordingly, when the torque is being inputted to the continuously variable transmission and the continuously variable transmission is thereby rotating, the hydraulic pump is driven simultaneously to feed the lubricating oil to the continuously variable transmission sufficiently. However, in case the continuously variable transmission is not used, i.e., when the rotation is halted, the hydraulic pump for feeding the lubricating oil and the lubrication system is halted. Because it is not only unnecessary to feed the lubricating oil, but also motivity is wasted unnecessarily. Accordingly, if the continuously variable transmission is left in the halt condition for a long time, following troubles may occur, such as; difluent of the lubricating oil from the rolling face of the power roller or the disc due to absence of the lubricating oil; disappear of the oil film due to evaporation; and shortage of the lubricating oil.

If the torque is inputted to the continuously variable transmission by starting the power source in spite of occurrence of such troubles, there is a possibility of occurring breakage of the oil film on the rolling face and causes abrasion such as adhesive wear on the power roller and the disc. That is, in the driving mechanism wherein the continuously variable transmission is directly connected to the power source such as an engine, the continuously variable transmission is rotated by being inputted the torque simultaneously with starting up of the engine, and transmission of the torque is executed between the power roller and the disc. Moreover, although the hydraulic pump is driven by the power source at the same time, the time lag is generated until the hydraulic oil is substantially fed, because of the absence of the oil from the hydraulic pipeline due to long term period of the halted condition, or because of the required time for saturating the oil in the oil passages. Accordingly, the power roller and the disc have to rotate without the oil film, or with shortage of the lubricating oil on its rolling face for a certain time from the start up. As a result, the breakage of the oil film is occurred and cause direct contact between the power roller and the disc. Therefore, there is a possibility for the continuously variable transmission to be out of order due to the abrasion at the contact portion between the power rollers and the discs.

This invention has been conceived in the view of the aforementioned technical problem and its object is to provide a lubrication device for a toroidal type continuously variable transmission which can certainly maintain the oil film by feeding the lubricating oil to the contact portion between the rolling members even when it is started up.

DISCLOSURE OF THE INVENTION

In order to solve the aforementioned problem, the present invention is characterized by being constructed to feed lubricating oil to the contact portion between rolling members or in its vicinity, even if the continuously variable transmission is under the halt condition. More specifically, according to the present invention, there is provided a lubrication device for a toroidal type continuously variable transmission which can set the speed change ratio steplessly by transmitting a torque inputted from a power source by the rolling members contacting each other through an oil film, and by varying the position of the contact portion of those rolling members continuously, characterized in that comprising: an auxiliary hydraulic power unit for generating an oil pressure without relying on said power source; a preliminary operation detecting device for detecting whether or not the preliminary operation relative to the start up of said power source is executed; and a preliminary lubricating mechanism for feeding the lubricating oil to the contact portion between the rolling members by means of the auxiliary hydraulic power unit before starting up said power source, when the preliminary operation is detected.

The auxiliary hydraulic power unit may be an electric oil pump or an accumulator. Also, in short, the preliminary operation detecting device may be constructed of a device for outputting a signal based on the behavior of the driver of the vehicle wherein the continuously variable transmission is mounted. Moreover, the preliminary lubricating mechanism may be constructed to feed the lubricating oil from the auxiliary hydraulic power unit, when the predetermined time elapsed after the preliminary operation is detected.

According to the present invention, therefore, when the preliminary operation for starting up of the halting power source is executed, the preliminary operation is detected by the preliminary operation detecting device. And then, the preliminary lubricating mechanism is operated and the lubricating oil is fed to the contact portion between the rolling members from the auxiliary hydraulic power unit. The auxiliary hydraulic power unit is constructed to generate the oil pressure without relying on the power source; therefore, the lubricating oil is fed to the contact portion between the rolling members even if the power source is under the halting condition and the continuously variable transmission is not rotating. Hence, according to the present invention, the oil film may be formed by feeding sufficient lubricating oil to the contact portion between the rolling members, where the transmission of the torque is generated, just before the continuously variable transmission starts to rotate, even if it has been halted in a long time. Consequently, disadvantages such as driving under the status of shortage of the lubricating oil, and abrasion in connection with such disadvantage is prevented in advance.

Also, according to the present invention, there is provided the lubrication device for a toroidal type continuously variable transmission which can set the speed change ratio steplessly, by transmitting a torque between the rolling members through an oil film formed in between the rolling members with the lubricating oil fed with pressurized, and by varying the position of the contact portion of those rolling members continuously, characterized in that: an oil reservoir portion for conserving a portion of the lubricating oil fed with pressurized when the rolling member is in the halt condition is provided in the vicinity of torque transmitting portion between the rolling members.

The oil reservoir portion may be constructed of a member for conserving the lubricating oil by impregnating, or a device for encapsulating the lubricating oil in a feeding pipeline of the lubricating oil.

According to the present invention, the lubricating oil is fed to the contact portion between the rolling members when the continuously variable transmission is rotating, and the oil film is thereby formed. A portion of the lubricating oil is conserved in the oil reservoir portion, and such status is maintained even after the continuously variable transmission is halted. Accordingly, the lubricating oil is fed to the contact portion between the rolling members immediately from the oil reservoir portion when the continuously variable transmission is restarted, and the oil film is formed or maintained. According to the present invention, therefore, the continuously variable transmission is not rotated with the broken oil film since time lag of feeding the lubricating oil is not generated at the start-up time. Consequently, disadvantages such as abrasion of the rolling members or following deterioration in the durability of the continuously variable transmission may be avoided in advance.

BEST MODE FOR CARRYING OUT THE INVENTION

Figure 1:
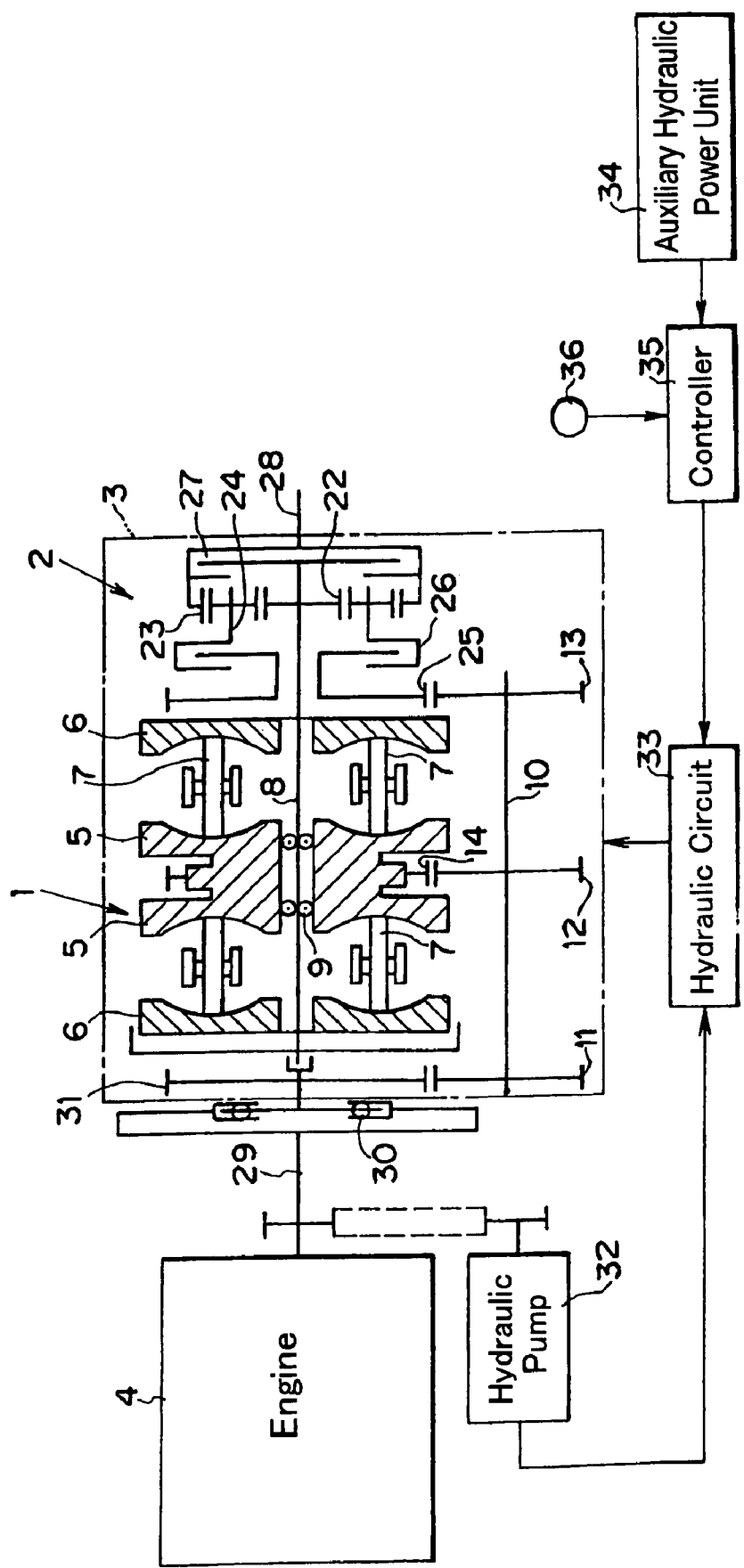
FIG. 1 is a skeleton drawing showing one example of a continuously variable transmission according to this invention typically.

Next, the present invention will be described in connection with a specific embodiment. First of all, one example of a transmission subjected to this invention will be described. A double cavity type full toroidal type continuously variable transmission 1, and a transmission 3 which comprises mainly a set of single pinion type planetary gear mechanism 2 are connected to the output side of an engine 4 as a power source. In the toroidal type continuously variable transmission 1, a pair of input discs 5 is arranged in so-called back-to-back relation, and a pair of output discs 6 is arranged to be opposed to those input discs 5, i.e., with sandwiching those input discs 5.

Those discs 5 and 6 are made such that portions of their opposed faces on an outer circumferential side from a predetermined radius are shaped, as cut in a plane on the center axis, to have a section of an arcuate plane of a predetermined radius, likewise the discs of the toroidal type continuously variable transmission according to the prior art. A power roller 7, which corresponds to an idling member or a transmission member, is sandwiched between the rolling faces formed into the arcuate planes. That is, one of the output discs 6 is fixed in the axial direction and a hydraulic chamber (not shown) is provided in the backside of another output disc 6 (opposite side of the rolling face). And the power roller 7 is clamped by each input discs 5 and the output discs 6 by means of feeding the oil pressure corresponding to the torque to be transmitted to the hydraulic chamber.

Here, each output discs 6 are connected with an output shaft 8 arranged along the center axis of those discs, and the output shaft 8 penetrates center portions of each input discs 5. Also, a bearing 9 is arranged between each input discs 5 and the output shaft 8, so as to allow those input discs 5 and the output shaft 8 to rotate relatively.

Moreover, an input shaft 10 is arranged rotatable in parallel with the output shaft 8. The input shaft 10 is slightly longer than the entire length of the continuously variable transmission 1, and gears 11, 12 and 13 are installed on three places in total such as its both front and rear end portions, and its intermediate portion. The gear 12 at the intermediate portion is engaged with the gear 14 integrated with said each input disc 5. Accordingly, the torque is inputted to the continuously variable transmission 1 from the input shaft 10 through those gears 12 and 14.

Moreover, the power roller 7 is a disc-shaped member, and a sectional shape of its outer circumference is formed into a curved face having a curvature equal to the arc of the rolling face of each disc 5 and 6. Accordingly, the power roller 7 is inclined with respect to the individual discs 5 and 6, thereby to change radial portions of the contact portions between the power roller 7 and the discs 5, 6 arbitrarily. Three power rollers 4 are arranged between each input discs 5 and output discs 6 at even intervals, and there are provided six in total for the continuously variable transmission 1 as a whole.

Figure 2:
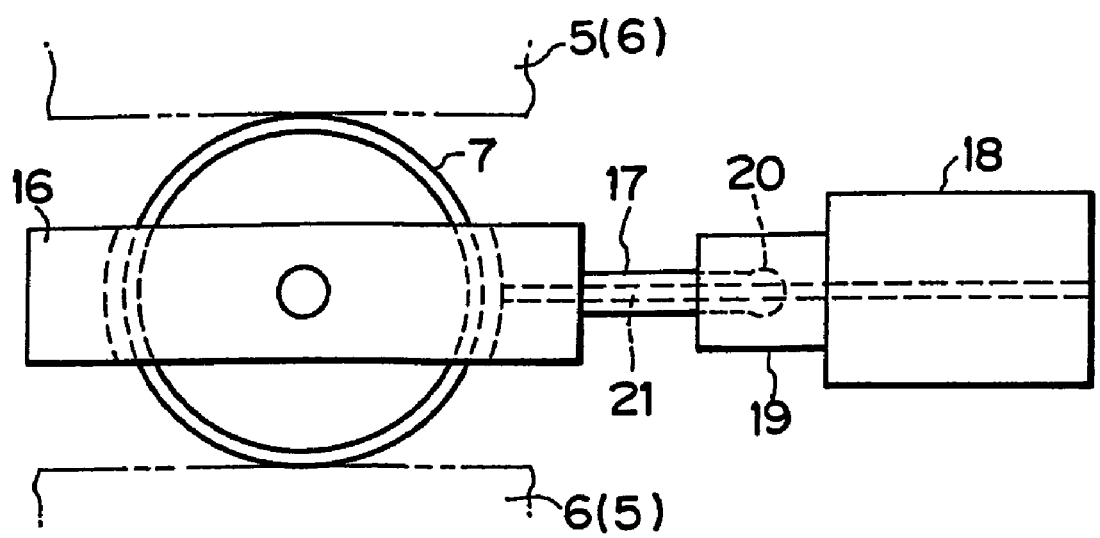
FIG. 2 is a schematic diagram showing one example of a power roller.

Furthermore, each power roller 7 is held rotatable and inclinable by a carriage 16 or a holding member. As shown in FIG. 2., the carriage 16 is constructed of two of upper and lower plate shaped members to hold the power roller 7 by clamping, with holding a shaft protruding both upward and downward and arranged on the center portions of the power roller 7 in the rotatable condition. A shaft portion 17 provided on one of the end portions in a longitudinal direction of the carriage 16 is connected to a piston rod 19 of a linear acting type hydraulic cylinder 18 through a ball joint 20. That is, the power roller 7 is moved backward and forward by the hydraulic cylinder 18, and the power roller 7 is inclined and rotated freely against the hydraulic cylinder 18.

Moreover, an oil passage 21 is formed with penetrating the piston rod 19 and carriage 16. The oil passage 21 feeds lubricating oil to the contact portion between the power roller 7 and each discs 5, 6, and opens to the portion opposed to the outer circumferential face of the power roller 7 at the carriage 16.

A set of planetary gear mechanism 2 is arranged on one of the end portion of the continuously variable transmission 1 (right hand side of FIG. 1). The planetary gear mechanism 2 is a known structured gear mechanism in which: a sun gear 22; a ring gear 23 as an internal gear arranged on the concentric circle against the sun gear 22; and a carrier 24 for holding a pinion gear which is engaged with those sun gear 22 and ring gear 23 allowable to rotate and revolute; function as rotary elements. The input shaft 8 is connected with the sun gear 22 to rotate integrally.

Also, a gear 25 is arranged between the planetary gear mechanism 2 and the continuously variable transmission 1, and engaged with the gear 13 provided on one of the end portion of the input shaft 10 (right end of FIG. 1). Moreover, there is provided a speed change clutch 26 for engaging the gear 25 and a carrier 24 selectively. Still moreover, there is provided a lock-up clutch 27 for engaging the sun gear 22 and the ring gear 23 selectively. And the output shaft 28 is joined to the ring gear 23.

An input gear 31 is installed on an output shaft 29 of aforementioned engine 4 through a damper 30, and engaged with the gear 11 installed on another end portion of the input shaft 10 (left end of FIG. 1). Accordingly, the torque is inputted to the transmission 3 through those gears 31 and 11.

Moreover, there is provided a hydraulic pump 32 driven by the engine 4. The hydraulic pump 32 generates an oil pressure for control purpose, and a part of the oil pressure is fed to the oil passage 21 to work as the lubricating oil. There is provided a hydraulic circuit 33 for executing such control of the oil pressure. An auxiliary hydraulic power unit 34 is connected to the oil circuit 33. The auxiliary hydraulic power unit 34 outputs the oil pressure temporarily on behalf of the hydraulic pump 32, and is constructed to output the oil pressure without relying on the engine 4. In concrete, the auxiliary hydraulic power unit 34 comprises an electric driven oil pump, an accumulator (pressure accumulating device) and so on.

There is provided a controller 35 for executing the control to have the auxiliary hydraulic power unit 34 performs as the hydraulic system of the lubricating oil on behalf of said hydraulic pump 32. The controller 35 executes controls such as, generating the oil pressure or outputs the oil pressure by the auxiliary hydraulic power unit 34, and accumulating the oil pressure in the auxiliary hydraulic power unit 34 if necessary. And it is constructed of a control device such as a valve, an electric control circuit and so on.

A sensor 36 is connected to the controller 35, which functions as a preliminary operation detecting means for detecting the condition of the hydraulic pump 32, or the engine 4 just before it is started up. In short, the preliminary operation is an operating status relates to the start up of the hydraulic pump 32 or the engine 4, for example, an operation for seating on a driver's sheet, an operation for depressing the brake pedal with sheeting on the driver's sheet, an operation for inletting a key into the key cylinder, an operation for holding a steering wheel, and an operation for taking a driving posture with sheeting on the driver's sheet. And the sensor 36 is constructed to detect those operations from make and brake of the contact point or image processed signals.

According to the aforementioned transmission 3, the torque is inputted through the gears 31 and 11, and the input shaft 10 by means of driving the engine 4. And the input disc 5 is rotated by transmitting the torque to the input disc 5 from the input shaft 10 through a pair of gears 12 and 14. Also, the torque is transmitted to the output disc 6 through the input disc by means of rotation of the input disc 5, and the output disc 6 is thereby rotated in the opposite direction.

Since the hydraulic pump 32 is driven by the engine 4 and generates the oil pressure when the torque is thus being transmitted, the lubricating oil is fed to the oil passage 21 through an oil circuit 33. As a result, the lubricating oil is blown to the outer circumferential face of the power roller 7 from the opening end of the oil passage 21. The lubricating oil thus adhered on the power roller 7 is fed to the contact portion between the discs 5 and 6 by means of the rotation of the power roller 7, so that the oil film is formed between the discs 5, 6, and the power roller 7. The power roller 7 contacts with the discs 5 and 6 through the oil film, and the torque is transmitted among the power roller 7, the disc 5, and the disc 6 by means of the shearing force of the oil film.

Thus, the engine torque is inputted to the transmission 3 immediately and the continuously variable transmission 1 is rotated when the engine 4 is driven. However, the torque is not appeared on the output shaft 28 when aforementioned each clutches 26 and 27 are kept released, because the torque is loosed from the carrier 23 of the planetary gear mechanism 2. That is to say, the status becomes neutral. Moreover, the sun gear 22 rotates at the number of revolutions according to the speed change ratio set in the continuously variable transmission 1, since the sun gear 22 of the planetary gear mechanism 2 is connected to the output disc 6 through the output shaft 8. On the other hand, the torque is transmitted to the carrier 24 from the input shaft 10 through a pair of gears 13 and 25 when the speed change clutch 26 is engaged, therefore, the carrier 24 rotates at the number of revolutions of the input shaft 10 and the gear ratio of its pair of gears 13 and 25.

Figure 3:
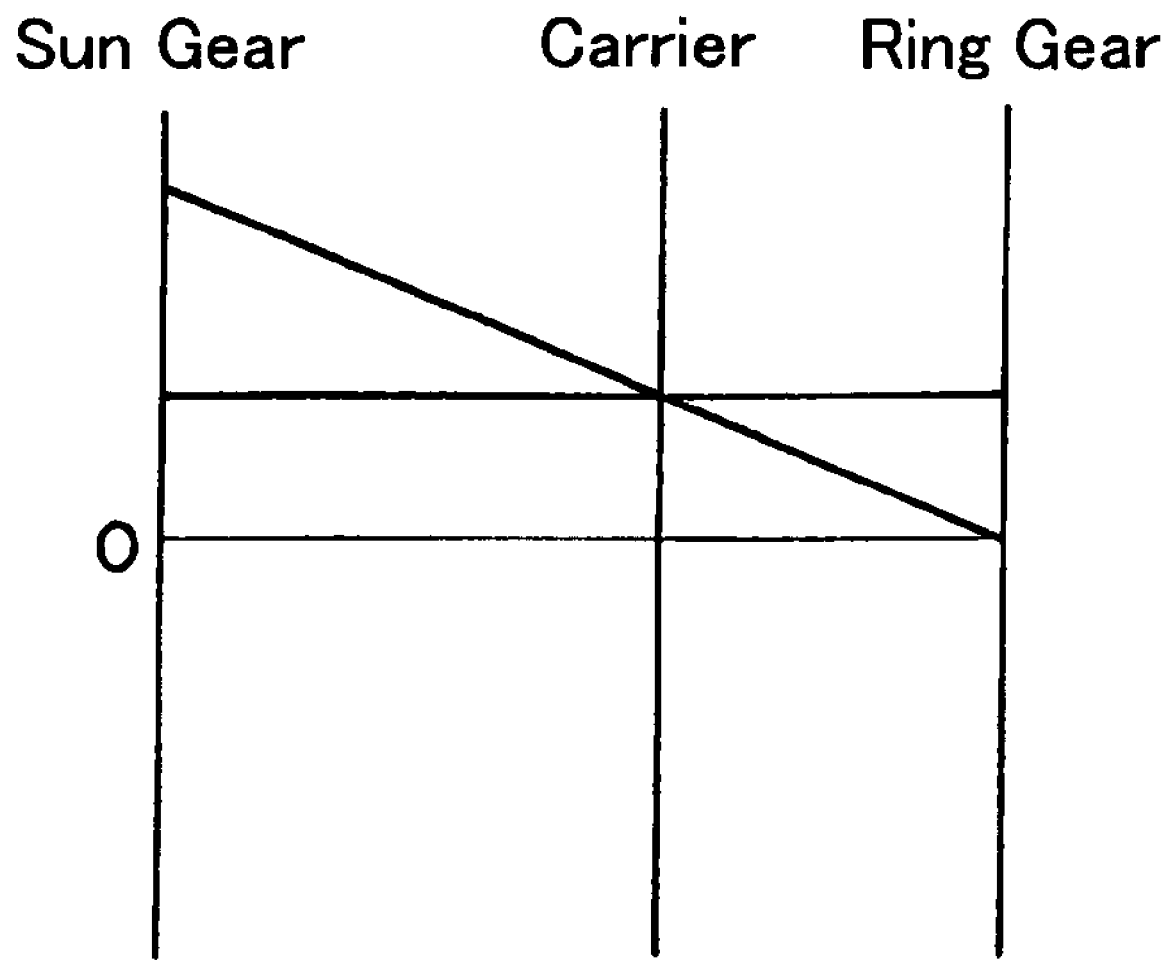
FIG. 3 is a nomographic diagram of a planetary gear mechanism comprises the continuously variable transmission according to FIG. 1.

Accordingly, when the speed change ratio is set small in the continuously variable transmission 1 and the sun gear 22 is rotated at a high speed against the carrier 24, the number of revolutions of the ring gear 23 becomes zero. Such situation of is described as a schematic diagram in FIG. 3. Under such situation, the output shaft 28 is in the halted condition together with the ring gear 23, likewise the aforementioned neutral condition. That is, according to the aforementioned transmission 3, the neutral status may be attained by setting the speed change ratio of the continuously variable transmission 1, without changing connecting status of the rolling members.

Here, the speed change operation of the continuously variable transmission 1 will be described briefly hereafter. The carriage 16 connected to the hydraulic cylinder 18 and its piston rod 19 is arranged with being inclined in longitudinal direction against the plane vertical to the center axis of the continuously variable transmission 1. When the piston rod 19 is moved backward and forward and moves the power roller 7 backward and forward on the plane vertical to the center axis of the continuously variable transmission 1, the power roller 7 is inclined according to its anteroposterior position. Consequently, the radial position of the contact portions of the power roller 7 against the input disc 5 and the output disc 6, i.e., the radial dimensions from the center axis of the continuously variable transmission 1 are differed each other. Namely, speed change operation is executed by moving the power roller 7 backward and forward as mentioned above, and predetermined speed change ratio is thereby set. Besides, without mentioning, the power rollers 7 in both cavities right and left are controlled in the same way simultaneously.

If the engine4 is halted to stop the rotation of the continuously variable transmission 1, the hydraulic pump 32 is thereby halted. Consequently, feeding of the lubricating oil to the continuously variable transmission 1 is also halted. If the halting status is continued, the lubricating oil adhered on the rolling faces of the power rollers 7 and the discs 5, 6 removes gradually and evaporates sparsely. As a result, the oil film may be broken or the amount of lubricating oil may fall short. Accordingly, when the engine 4 is started after the long time period of halted status, the continuously variable transmission 1 has to start rotating under the conditions such as: a breakage of the oil film on the rolling face of the continuously variable transmission 1; or a shortage of the lubricating oil; so that an abrasion due to direct contact between the power roller 7 and the discs 5, 6 could occur. In this connection, aforementioned lubrication device according to the present invention execute lubricating at the start-up occasion as described hereinafter.

Figure 4:
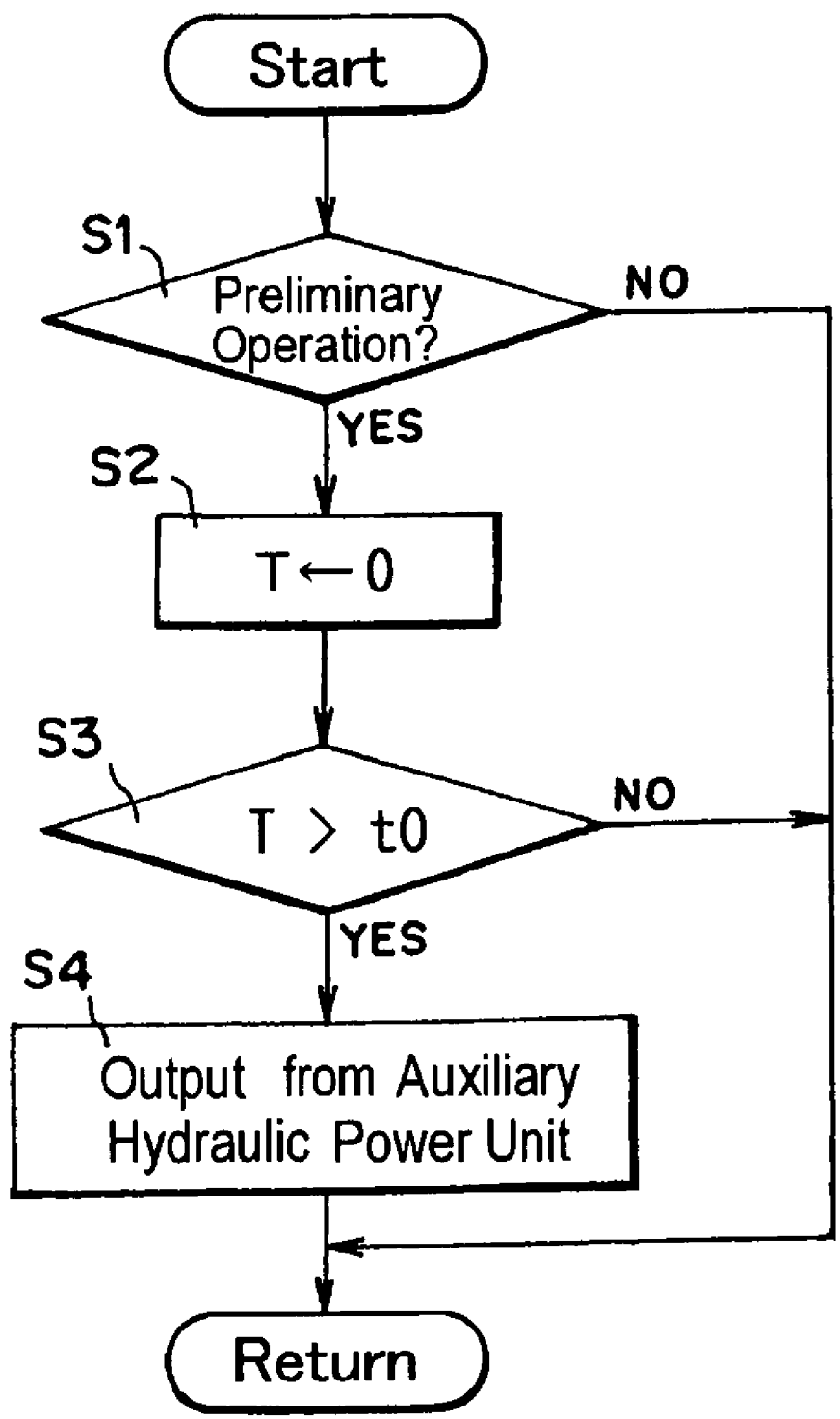
FIG. 4 is a flow chart describing an example to execute lubrication by an auxiliary hydraulic power unit prior to rotate the continuously variable transmission.

FIG. 4 is a flowchart to describe one example of the patterns of lubrication. First of all, the presence of preliminary operation relates to the start-up of the engine 4 or the hydraulic pump 32 is decided (Step S1). This may be decided based on, for example, a switch-on of the seating sensor arranged on the driver's seat, or a closing of the predetermined contact point by inletting a key into a cylinder. If the answer of Step S1 is NO because of the absence of preliminary operation, the routine is returned without executing any specific control. On the other hand, if the answer of Step S1 is YES because of the detection of any of preliminary operation, a timer T is reset to zero and count of time is started (Step S2).

Then, it is detected whether or not the count value of the timer T exceeds the predetermined criterion value t0, i.e., whether or not the predetermined time has elapsed since the preliminary operation is detected (Step 3). If the answer of Step S3 is NO for the reason that the predetermined time has not lapsed yet, the routine is returned without executing any special operation. On the contrary, if the answer of Step S3 is YES for the reason that the predetermined time has lapsed since the preliminary operation is detected, aforementioned controller 35 is operated to output the oil pressure from the auxiliary hydraulic power unit 34 (Step S4).

According to the aforementioned device as shown in FIG. 1, the hydraulic pump 32 is halted and the oil pressure to be fed to the continuously variable transmission 1 is not generated, when the engine 4 is halted. However, the lubricating oil is fed to the oil passage 21 from the auxiliary hydraulic power unit 34 through the hydraulic circuit 33 when the preliminary operation is detected. Consequently, the lubricating oil is fed to the outer circumferential face of the power roller 7 which is in the halting condition, or to the contact portion between the discs 5, 6 and the power roller 7, and the oil films are formed on those portions. Accordingly, when the continuously variable transmission 1 is rotated in connection with the start-up of the engine 4 afterward, the discs 5, 6 and the power roller 7 in which the lubricating oil is already fed and the oil film is formed thereon are rotated, so that the direct contact between the power roller 7 and the discs 5, 6, or the accompanying adhesive wear can be avoided.

Besides, since the engine 4 is not always started up after the preliminary operation decided by said Step S1, it is preferable to be constructed to feed bare essentials of the lubricating oil intermittently at regular intervals, instead of feeding large amount of the lubricating oil all at once from the auxiliary hydraulic power unit 34. If constructed as such, the entire construction of the device can be downsized by means of making the capacity of the auxiliary hydraulic power unit 34 small. Also, in general, the average elapsed time until the engine 4 is started up since the moment that the driver takes a sheet is longer than the average elapsed time until the engine 4 is started up since the moment that the key is inlet into a cylinder. The elapsed times until start up of the engine 4 after the execution of each preliminary operation are thus different, therefore, the time t0 as a criterion of decision of Step S3 may also be set for each preliminary operation.

Figure 5:
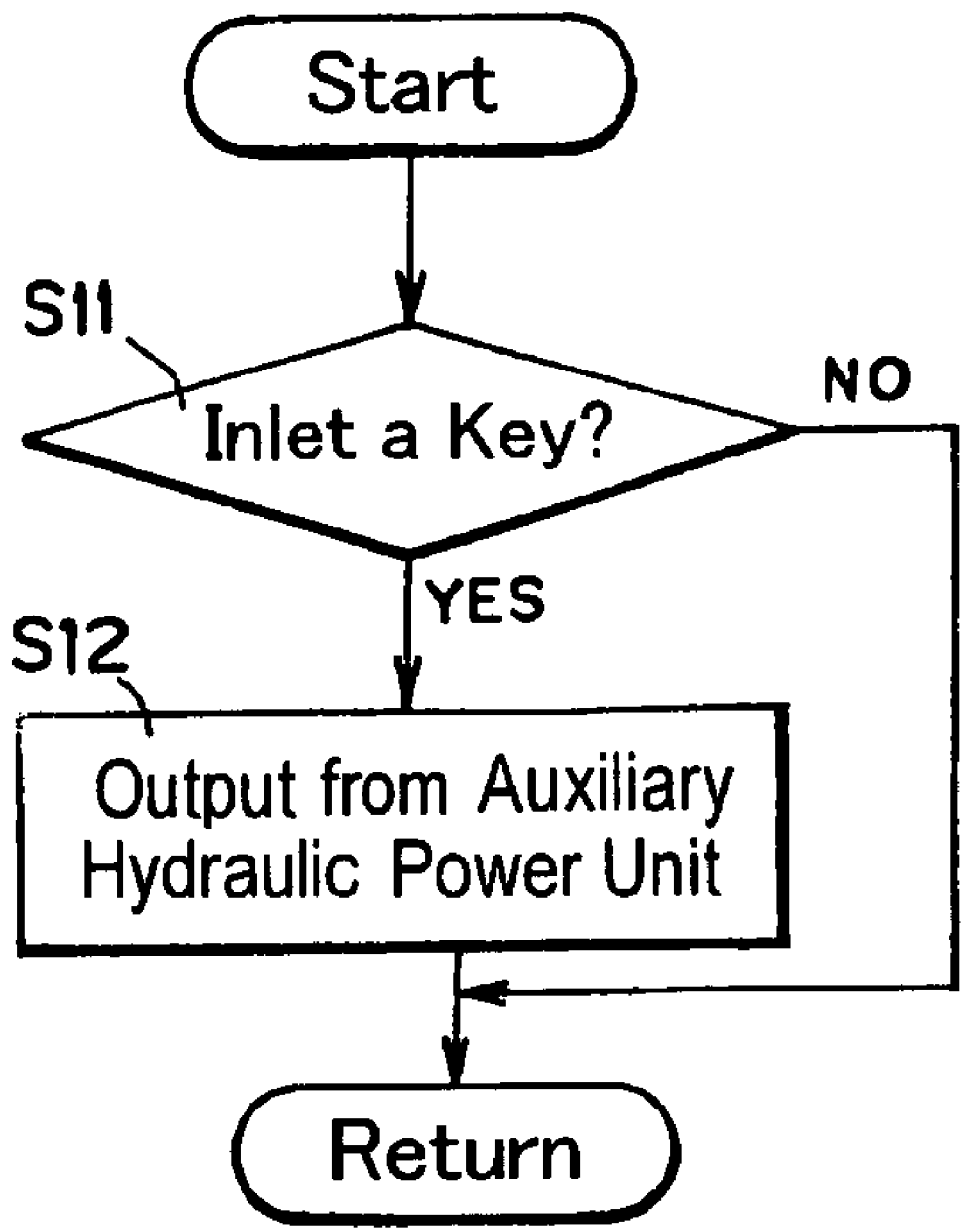
FIG. 5 is a flow chart describing another example to execute lubrication by an auxiliary hydraulic mechanism prior to rotate the continuously variable transmission.

FIG. 5 is a flowchart to describe another pattern of lubrication employing the auxiliary hydraulic power unit 34. The example shown therein is a control example in case of inletting a key into a cylinder. That is, it is detected by aforementioned sensor 36 that the key is inlet into the cylinder (Step S11), and if the answer of Step S11 is YES based on the detection result, the oil pressure is outputted intermittently at regular intervals by the auxiliary hydraulic power unit 34 (Step S12). Accordingly, the lubricating oil is fed to the outer circumferential face of the power roller 7, or to the contact portion between the discs 5, 6 and the power roller 7 just before starting to operate, and the oil films are formed on those portions. Therefore, when the continuously variable transmission 1 is rotated in connection with the start-up of the engine 4, the discs 5, 6 and the power roller 7 in which the lubricating oil is already fed and the oil film is formed thereon are rotated, so that the direct contact between the power roller 7 and the discs 5, 6, or the accompanying adhesive wear can be avoided.

Thus, aforementioned sensor 36, the device for executing Step S1, or Step S11 correspond to the preliminary operation detector according to the present invention. Also, the hydraulic system from the auxiliary hydraulic power unit 34 to the oil passage 21 including aforementioned controller 35 corresponds to the preliminary lubrication mechanism according to the present invention.

By the way, the present invention comprises a construction for feeding the lubricating oil to the contact portion between the power roller 7 and each disc 5, 6 or to the rolling faces of the power roller 7 and each disc 5, 6 before the continuously variable transmission 1 which has been in a halted condition is started to rotate. Accordingly, the means for feeding the lubricating oil for that purpose is not limited to the embodiments as mentioned above. Namely, it may be constructed to provide a means which can maintain the lubricating oil in the vicinity of the contact portion between the power roller 7 and the discs 5, 6 even when the continuously variable transmission 1 is in the halted condition. The example will be described hereinafter.

Figure 6:
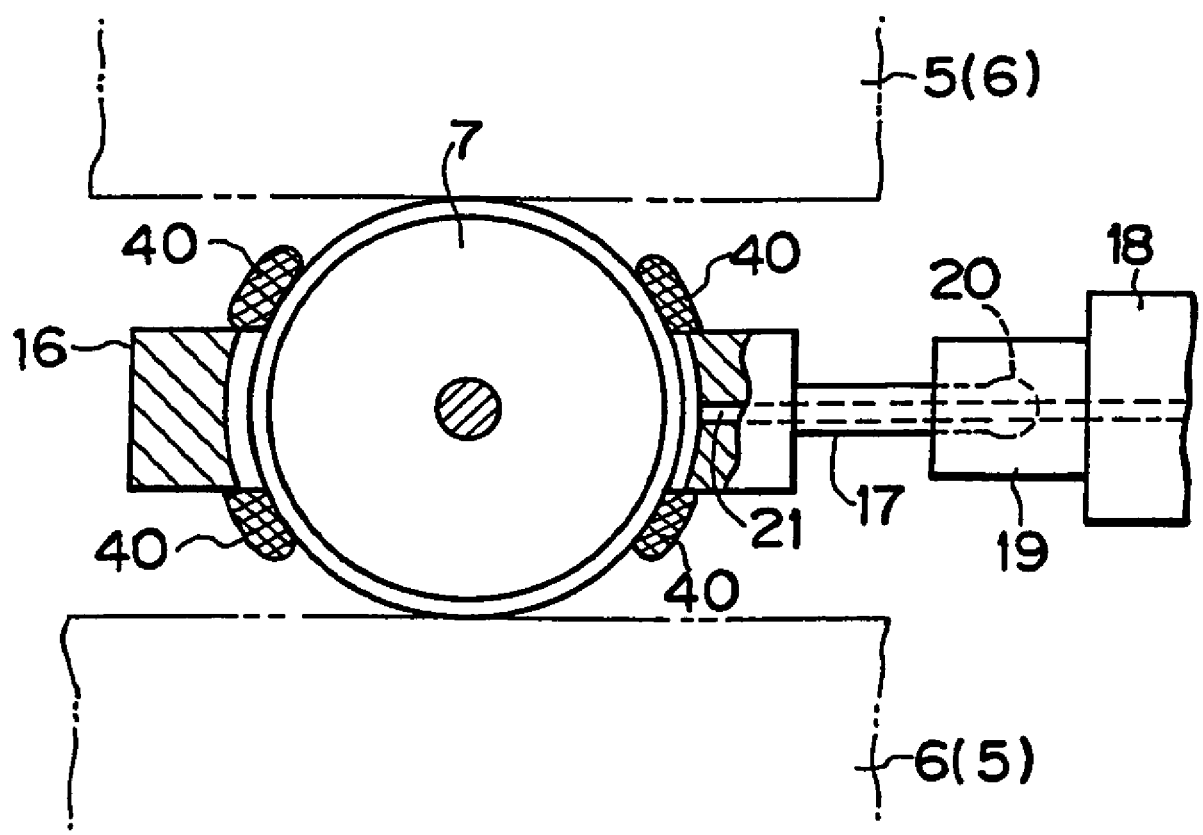
FIG. 6 is a schematic diagram showing one example of a power roller which comprises a porosities as an oil reservoir portions.

FIG. 6 depicts the example which is provided a porosity 40 functions as an oil reservoir portion for conserving the lubricating oil with impregnating. The porosity 40 as shown therein is a porous structured material such as a bonded fiber fabric like a felt or a sponge which allows the lubricating oil to infiltrate therein. It is preferably made from a flexible material, and installed on the carriage 16 to contact with the outer circumferential face of the power roller 7.

According to the construction as shown in FIG. 6, the lubricating oil pressurized and fed by the hydraulic pump 32 under the regular operating condition is impregnated into the porosity 40 little by little with being in touch on the porosity 40 and conserved therein by means of the rotation of the power roller 7. Such conservation of the lubricating oil is resulted from the capillary action generated from the porosity 40, so that the lubricating oil is conserved even if the rotation of the power roller 7 is halted.

Moreover, when the power roller 7 is rotated after the amount of the lubricating oil adhered on the surface of the power roller 7 is dropped off due to the comparatively long term continuation of the halting status of the power roller 7, a condition in which the lubricating oil conserved in the porosity 40 is daubed on the outer circumferential face of the power roller 7 is generated, because the amount of the lubricating oil impregnated into the porosity 40 is larger than the amount of the lubricating oil on the surface of the power roller 7. Such condition is the same condition as feeding the lubricating oil to the outer circumferential face of the power roller 7 from the porosity 40. Accordingly, even if the continuously variable transmission 1 is rotated by starting the engine 4 after the long term halting condition, sufficient lubricating oil is fed onto the rolling face or the contact portion between the power roller 7 and the discs 5, 6 simultaneously with the rotation. As a result, disadvantages such as the breakage of oil film or accompanying direct contact between the power roller 7 and the discs 5, 6 are avoided in advance, and abrasion of the power roller 7 and the discs 5, 6 is also prevented, thereby to improve the endurance of the continuously variable transmission 1.

Figure 7:
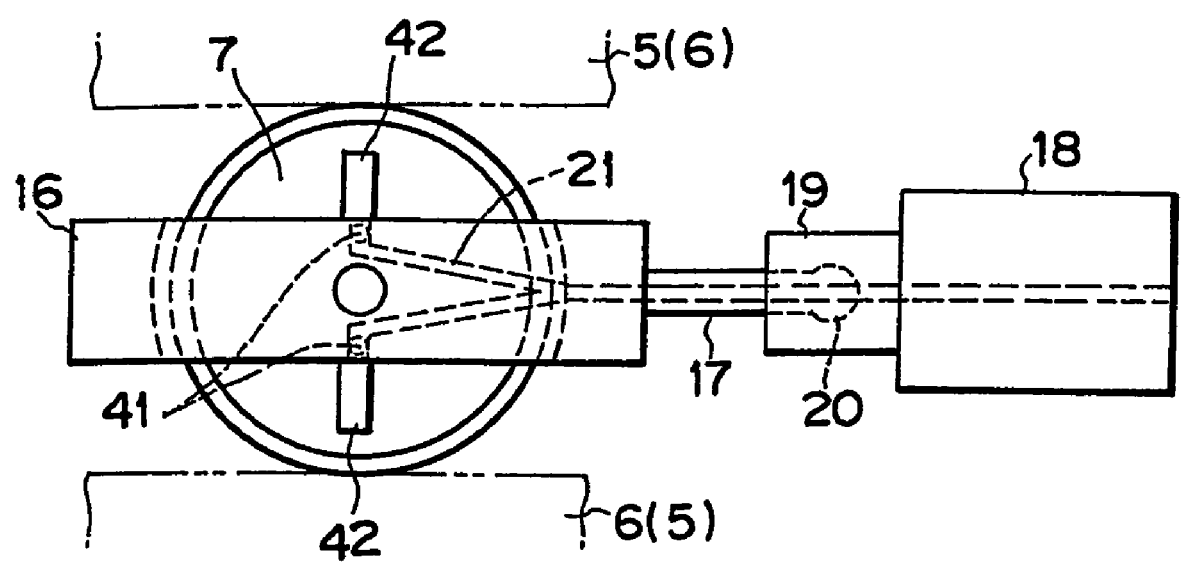
FIG. 7 is a schematic diagram showing one example of a power roller which is constructed to have an oil reservoir portion on a portion of an oil passage.

The oil reservoir portion for conserving the lubricating oil in the vicinity of the contact portion between the power roller 7 and the discs 5, 6 when the continuously variable transmission 1 is halted may be formed with utilizing the oil passage 21 formed on the carriage 16. The example is depicted in FIG. 7. In the example shown therein, the oil passage 21 formed on the carriage 16 is bent right and left at almost its intermediate portion in the longitudinal direction of the carriage 16, and opens to the side face of the carriage 16. Accordingly, it is constructed to spray the lubricating oil directly to the contact portion between the power roller 7 and the discs 5, 6 located in front of the opening end. A check valve 41 is provided in the vicinity of opening end of the oil passage 21, which is opened by the differential pressure in the spraying direction of the lubricating oil, and is closed by the differential pressure in the opposite direction.

Accordingly, the lubricating oil pressurized by the hydraulic pump 32 is fed to the oil passage 21 under the regular operation, therefore, the lubricating oil is blown to the outer circumferential portion of the power roller 7 with opening the check valve 41 by pressing, and the lubricating oil is fed to the contact portion between the power roller 7 and the discs 5, 6. When the hydraulic pump 32 is halted by stopping the engine 4, on the contrary, the pressure of the oil passage 21 is dropped and the check valve 41 is closed automatically. As a result, since the ambient air is not introduced from the opening end of the oil passage 21, adverse current of the lubricating oil in the oil passage 21 is prohibited and the lubricating oil is conserved in the oil passage 21.

Also, in case of rotating the continuously variable transmission 1 by restarting the engine 4, the hydraulic pump 32 is driven simultaneously and generates the oil pressure. In this case, saturating condition of the lubricating oil at the piping from the hydraulic pump 32 to the oil passage 21 is degraded sometimes, if the period of the halting condition is long. However, the pressure of the pipeline of the discharging side and the oil passage 21 communicated with such pipeline is increased by the operation of the hydraulic pump 32, so that the lubricating oil conserved in the oil passage 21 is blown immediately with opening the check valve 41 by pressing.

Accordingly, the lubricating oil is fed to the contact portions between the power roller 7 and the discs 5, 6 without delaying to start the rotation of the power roller 7 and the discs 5, 6. Consequently, troubles such as direct contact between the power roller 7 and the discs 5, 6 and so on are avoided in advance, and abrasion of the power roller 7 and the discs 5, 6 is also prevented, thereby to make the endurance of the continuously variable transmission 1 preferable.

Besides, the reference numeral 42 in FIG. 7 represents a spray nozzle, which is installed with being communicated with the opening end of the oil passage 21. The leading end of the spray nozzle 42 is leading to the vicinity of the contact portion between the power roller 7 and the discs 5, 6. As mentioned above, at least a part of the lubricating oil saturated in the spray nozzle 42 is conserved in the spray nozzle 42, when the check valve 41 is closed. Therefore, feeding of the lubricating oil to the contact portion between the power roller 7 and the discs 5, 6 becomes further quicker and more reliable when the continuously variable transmission 1 in the halting condition is rotated again.

Here, this invention should not be limited to the specific embodiments thus far described, but it is sufficient for the oil reservoir portion according to the present invention to be constructed as which can conserve the lubricating oil in the vicinity of contact portion between the rolling members when the continuously variable transmission 1 is in the halting condition, and can feed the lubricating oil to the contact portion between the rolling members when the continuously variable transmission 1 is rotated, such as a particularly provided container, a concave portion, a hollow portion and so on, other than the oil passage 21 comprising aforementioned porosity and the check valve 41. Moreover, a full toroidal type continuously variable transmission is depicted in the drawings; however, the present invention may be applied to a half toroidal type continuously variable transmission also.

Here will be synthetically described the advantages to be attained by this invention. According to the present invention as has been described hereinbefore, the lubricating oil is fed to the contact portion between the rolling members from the auxiliary hydraulic power unit by the operation of the preliminary lubricating mechanism in connection with the detection result of execution of preliminary operation relevant to the start up of the power source in the halting condition. Moreover, the auxiliary hydraulic power unit is constructed to generate the oil pressure without relying on the power source, so that the lubricating oil can be fed to the contact portion between the rolling members even if the power source is in the halting condition and the continuously variable transmission is not rotated. Therefore, according to the present invention, the oil film may be formed by feeding sufficient lubricating oil to the contact portion between the rolling members in which the transmission of the torque is generated, just before the continuously variable transmission is started to rotate, even if it has been in the halting condition for a long time. As a result, disadvantages such as an operation with the breakage of the oil film, and abrasion in connection with such disadvantage may be eliminated.

Furthermore, according to the present invention, when the continuously variable transmission is rotated, the lubricating oil is fed to the contact portion between the rolling members to form the oil film thereon, and a part of the lubricating oil is conserved in the oil reservoir portion. Such condition is maintained even after the continuously variable transmission is halted; therefore, when the continuously variable transmission is restarted, the lubricating oil is fed to the contact portion between the rolling members from the oil reservoir portion immediately and the oil film is formed or maintained. According to the present invention, therefore, the continuously variable transmission may not be rotated under the condition of breakage of the oil film, because no delay of feeding of the lubricating oil is occurred as the start-up. Accordingly, abrasion of the rolling members and degrading of duration of the continuously variable transmission is prevented in advance.

INDUSTRIAL APPLICABILITY

This invention may be utilized in the field for manufacturing the continuously variable transmission and in the field for using the continuously variable transmission. Especially, this invention may be utilized in the field relating to an automobile having the continuously variable transmission mounted thereon.

The invention claimed is:

1. A lubrication device for a toroidal type continuously variable transmission which sets a speed change ratio steplessly by transmitting a torque inputted from a power source by means of rolling members contacting each other through an oil film, and by varying the position of the contact portion of those rolling members continuously, comprising:
   an auxiliary hydraulic power unit for generating an oil pressure without relying on said power source;
   a preliminary operation detector for detecting whether or not a preliminary operation relevant to the start up of said power source is executed; and
   a preliminary lubricating mechanism for feeding a lubricating oil to the contact portion between said rolling members by means of said auxiliary hydraulic power unit before starting up said power source, when the preliminary operation is detected.

2. The lubrication device for a toroidal type continuously variable transmission according to claim 1,
   wherein said auxiliary hydraulic power unit includes either an electric pump or an accumulator.

3. The lubrication device for a toroidal type continuously variable transmission according to claim 2,
   wherein said rolling member includes a pair of first rolling members, and a second rolling member clamped in between the first rolling members; and
   by further comprising,
      a holding member for holding said second rolling member rotatable and inclinably; and
      an oil passage which opens to the portion opposed to the outer circumferential face of the second rolling member with penetrating said holding member, for spraying the lubricating oil fed from said auxiliary hydraulic power unit to the outer circumferential face of the second rolling member.

4. The lubrication device for a toroidal type continuously variable transmission according to claim 1,
   wherein said preliminary lubricating mechanism includes a mechanism for feeding the lubricating oil to the contact portion between said rolling members by means of said auxiliary hydraulic power unit, when the predetermined time elapsed after the preliminary operation is detected by said preliminary operation detector.

5. The lubrication device for a toroidal type continuously variable transmission according to claim 4,
   wherein said rolling member includes a pair of first rolling members, and a second rolling member clamped in between the first rolling members; and
   by further comprising,
      a holding member for holding said second rolling member rotatable and inclinably; and
      an oil passage which opens to the portion opposed to the outer circumferential face of the second rolling member with penetrating said holding member, for spraying the lubricating oil fed from said auxiliary hydraulic power unit to the outer circumferential face of the second rolling member.

6. The lubrication device for a toroidal type continuously variable transmission according to claim 1, further comprising:
   an oil reservoir portion for conserving a portion of the lubricating oil fed with pressurized when the rolling member is in the halt condition is provided in the vicinity of torque transmitting portion between the rolling members.

7. The lubrication device for a toroidal type continuously variable transmission according to claim 6,
   wherein said oil reservoir portion includes one of a member for conserving the lubricating oil with impregnating and a mechanism for encapsulating the lubricating oil in a feeding pipeline of the lubricating oil.

8. The lubrication device for a toroidal type continuously variable transmission according to claim 6,
   wherein said toroidal type continuously variable transmission is a full toroidal type comprising a pair of discs which have a full toroidal type transmission arcuate plane on its opposed face and a power roller which is clamped in between those opposed faces, and the torque is transmitted through the oil film formed in between the power roller and said pair of discs.

9. The lubrication device for a toroidal type continuously variable transmission according to claim 6, wherein said rolling members include a pair of first rolling members, and a second rolling member clamped in between the first rolling members;

by further comprising, a holding member for holding said second rolling member rotatable and inclinably;

an oil passage which opens to the torque transmitting portion between each rolling members with penetrating said holding member and sprays said lubricating oil to said torque transmitting portion; and a check valve arranged inside of the oil passage which opens when a pressure acts in the direction of spraying the lubricating oil to the torque transmitting portion, and closes when the pressure acts in the opposite direction, and wherein said oil reservoir portion is formed inside of said oil passage with the check valve.

10. The lubrication device for a toroidal type continuously variable transmission according to claim 1, wherein said rolling member includes a pair of first rolling members, and a second rolling member clamped in between the first rolling members; and by further comprising, a holding member for holding said second rolling member rotatable and inclinably; and an oil passage which opens to the portion opposed to the outer circumferential face of the second rolling member with penetrating said holding member, for spraying the lubricating oil fed from said auxiliary hydraulic power unit to the outer circumferential face of the second rolling member.

11. The lubrication device for a toroidal type continuously variable transmission according to claim 10, wherein an oil reservoir portion for conserving a portion of said fed lubricating oil when the rolling member is in the halt condition is provided in the vicinity of torque transmitting portion between the rolling members.

12. The lubrication device for a toroidal type continuously variable transmission according to claim 11, wherein said oil reservoir portion includes one of a member for conserving the lubricating oil with impregnating and a mechanism for encapsulating the lubricating oil in a feeding pipeline of the lubricating oil.

13. The lubrication device for a toroidal type continuously variable transmission according to claim 1, wherein said toroidal type continuously variable transmission is a full toroidal type comprising a pair of discs which have a full toroidal type transmission arcuate plane on its opposed face and a power roller which is clamped in between those opposed faces, and the torque is transmitted through the oil film formed in between the power roller and said pair of discs.

14. The lubrication device for a toroidal type continuously variable transmission according to claim 1, wherein said preliminary operation detector includes one of, a switch for outputting a signal in accordance with the behavior of a driver of a vehicle on which said continuously variable transmission is mounted, and a device for outputting the signal obtained by processing a image of the driver.

15. The lubrication device for a toroidal type continuously variable transmission according to claim 14, wherein said rolling member includes a pair of first rolling members, and a second rolling member clamped in between the first rolling members; and by further comprising, a holding member for holding said second rolling member rotatable and inclinably; and an oil passage which opens to the portion opposed to the outer circumferential face of the second rolling member with penetrating said holding member, for spraying the lubricating oil fed from said auxiliary hydraulic power unit to the outer circumferential face of the second rolling member.

16. A lubrication device for a toroidal type continuously variable transmission which sets a speed change ratio steplessly by transmitting a torque inputted from a power source by means of rolling members contacting each other through an oil film, and by varying the position of the contact portion of those rolling members continuously, comprising:

an auxiliary hydraulic power unit for generating the oil pressure without relying on said power source; and a controller for feeding the lubricating oil to the contact portion between said rolling members from said auxiliary hydraulic power unit before start-up of said power source, when said preliminary operation relevant to the start-up of said power source is detected.

17. The lubrication device for a toroidal type continuously variable transmission according to claim 16, wherein said toroidal type continuously variable transmission is a full toroidal type comprising a pair of discs which have a full toroidal type transmission arcuate plane on its opposed face and a power roller which is clamped in between those opposed faces, and the torque is transmitted through the oil film formed in between the power roller and said pair of discs.

18. The lubrication device for a toroidal type continuously variable transmission according to claim 16, wherein said rolling member includes a pair of first rolling members, and a second rolling member clamped in between the first rolling members; and by further comprising, a holding member for holding said second rolling member rotatable and inclinably; and an oil passage which opens to the portion opposed to the outer circumferential face of the second rolling member with penetrating said holding member, for spraying the lubricating oil fed from said auxiliary hydraulic power unit to the outer circumferential face of the second rolling member.

* * * * *